US009822562B2

(12) United States Patent
Borth et al.

(10) Patent No.: US 9,822,562 B2
(45) Date of Patent: Nov. 21, 2017

(54) VEHICLE DOOR ASSEMBLIES, AND METHODS OF USE AND MANUFACTURE THEREOF

(71) Applicant: Honda Motor Co., Ltd., Tokyo (JP)

(72) Inventors: Jacob O Borth, Raymond, OH (US); Justin A. Newton, Raymond, OH (US); Alexander C. Tindle, Raymond, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/001,530

(22) Filed: Jan. 20, 2016

(65) Prior Publication Data

US 2017/0204643 A1    Jul. 20, 2017

(51) Int. Cl.
*B60J 5/00* (2006.01)
*E05D 5/02* (2006.01)
*E05D 3/02* (2006.01)
*E06B 3/36* (2006.01)
*E05D 11/00* (2006.01)

(52) U.S. Cl.
CPC .............. *E05D 5/0207* (2013.01); *B60J 5/00* (2013.01); *E05D 3/02* (2013.01); *E06B 3/36* (2013.01); *E05D 2011/009* (2013.01); *E05Y 2900/531* (2013.01); *Y10T 16/5513* (2015.01)

(58) Field of Classification Search
CPC . Y10T 16/551; Y10T 16/5513; E05D 5/0207; E05D 3/02; E06B 3/36
USPC ...................... 16/374, 375; 296/146.11, 207; 292/DIG. 72, DIG. 73
See application file for complete search history.

(56) References Cited

U.S. PATENT DOCUMENTS

| 136,040 | A | * | 2/1873 | Darrell | ..................... E05D 11/06 16/375 |
| 167,576 | A | * | 9/1875 | Skidmore | ........... E05D 11/0027 16/375 |
| 367,742 | A | * | 8/1887 | Byrne | ..................... E05D 11/00 16/375 |
| 525,712 | A | * | 9/1894 | Knittel | .................. E05D 7/0027 16/244 |

(Continued)

FOREIGN PATENT DOCUMENTS

| CN | 201416331 Y | 3/2010 |
| CN | 102700622 A | 10/2012 |

(Continued)

*Primary Examiner* — Dennis H Pedder
(74) *Attorney, Agent, or Firm* — Kenealy Vaidya LLP

(57) ABSTRACT

A hinge assembly includes a door bracket attached to the vehicle door, the door bracket including a flange that is configured to define a door bracket aperture. A body bracket is attached to the vehicle body member, the body bracket including a flange that is configured to define a body bracket aperture. A pin extends through the door bracket aperture and the body bracket aperture to thereby connect together the door and body brackets. A bumper projects from one of the door bracket and the body bracket. A stopper is attached to the other of the door bracket and the body bracket, the stopper being configured to contact the bumper when the vehicle door is disposed in the closed position to thereby move the pin into contact with surfaces of the flanges of the door and body brackets that define the door bracket aperture and the body bracket aperture.

21 Claims, 5 Drawing Sheets

(56) References Cited

U.S. PATENT DOCUMENTS

| | | | |
|---|---|---|---|
| 1,762,629 A * | 6/1930 | Huesman | B62D 25/04 |
| | | | 16/389 |
| 2,975,013 A | 3/1961 | Wallace et al. | |
| 3,889,316 A * | 6/1975 | Koike | E05D 11/1042 |
| | | | 16/297 |
| 4,012,807 A | 3/1977 | Kern | |
| 4,097,958 A | 7/1978 | Van Dell | |
| 4,610,049 A | 9/1986 | Dean | |
| 5,509,175 A | 4/1996 | Baughan | |
| 5,791,017 A | 8/1998 | Klueting | |
| 6,178,593 B1 * | 1/2001 | Carlson | E05F 7/005 |
| | | | 16/235 |
| 6,568,741 B1 | 5/2003 | Leung | |
| 6,718,596 B2 | 4/2004 | Kohlstrand et al. | |
| 6,817,064 B2 | 11/2004 | Kim et al. | |
| 2004/0148737 A1 | 8/2004 | Dunneback et al. | |
| 2008/0092333 A1 | 4/2008 | Migli | |
| 2014/0029174 A1 | 1/2014 | Chang et al. | |

FOREIGN PATENT DOCUMENTS

| | | | |
|---|---|---|---|
| DE | 20304145 U1 | | 7/2003 |
| EP | 2815151 | * | 2/2013 |
| GB | 854143 A | | 11/1960 |

\* cited by examiner

VEHICLE DOOR ASSEMBLIES, AND METHODS OF USE AND MANUFACTURE THEREOF

BACKGROUND

The disclosed subject matter relates to vehicle door assemblies, and methods of use and manufacture thereof. In particular, the disclosed subject matter relates to methods and apparatus for attaching vehicle doors, and/or elements thereof, to vehicle support members, such as sections of the vehicle frame, etc.

Many types of vehicles include doors and/or other structures that enable passenger ingress and/or egress. These vehicle doors are typically configured to be actuable (such as via pivoting or rotational movement) between an open position facilitating passenger ingress/egress, and a closed position impeding passenger ingress/egress. These types of vehicle doors in the closed position thereby operate as a barrier between the vehicle exterior and interior passenger compartment.

SUMMARY

Many different types of structures can be used to allow the vehicle doors to adopt the open and closed positions, and to be actuable therebetween. For example, a hinge assembly can be used to connect the vehicle door to a vehicle structural member to thereby allow adoption of these positions as well as the requisite actuation therebetween. In some of these structures, a body bracket is attached to the vehicle structural member, and a separate door bracket is attached to the vehicle door. These attachments can be performed using any known, related art, or later developed technologies, such as mechanical fasteners (e.g., rivets, bolts, etc.), glue, epoxy, welding, etc. A connector can then be used to connect together the body bracket and the door bracket.

Embodiments are intended to include or otherwise cover any type of connector for connecting the body and door brackets. In some embodiments, each of the body and door brackets includes a flange that defines an aperture, such as an aperture that extends through the entire flange and is circular as viewed from above or below. A pin can be disposed so as to extend through the apertures of the body and door brackets to thereby connect these elements and thereby allow the vehicle door to adopt the open and closed positions, and to be actuable therebetween.

In some of these embodiments, the pin can be configured to facilitate the connection of these elements and vehicle door actuation. For example, the pin can be cylindrical and define a circular cross-section corresponding to the circular apertures defined in the flanges of the body and door brackets.

In addition, the connector can be configured to further enhance the connection of these elements and vehicle door actuation. For example, the body and door brackets can be elongated and each connected to their respective elements, i.e., the door bracket attached to the vehicle door, and the body bracket attached to the vehicle structural member, at top and bottom locations. Each of the body and door brackets can also include a pair of flanges that each define circular apertures, and the cylindrical pin can be elongated to extend through all four apertures, i.e., the apertures defined in both pairs of flanges.

In some of these embodiments, the diameter of each of the apertures defined in the flanges is larger than the diameter of the pin in order to facilitate entry of the pin into and through the apertures. Thus, a gap is defined between the outer surface of the pin and the surface of each of the flanges that defines the aperture. This gap may thereby allow movement of the pin within the apertures in a transverse direction, i.e., a direction at an angle or perpendicular to the direction of extension of the pin, when the door is in the closed position. This lateral movement may occur during movement of the vehicle, and may be accentuated if the vehicle is subject to jostling movement, such as where the vehicle travels along an uneven or bumpy road.

This lateral movement may be disadvantageous in various respects. For example, the lateral movement of the pin within the apertures of the flanges may create noise that is transmitted to the passenger compartment and may be unpleasant for vehicle passengers. In addition, this movement may degrade the affected elements, i.e., the pin and the flange, causing deterioration.

Thus, it may be beneficial to configure the above connector to impede, reduce, or avoid lateral movement of the pin within the apertures of the flanges when the door is in the closed position. Embodiments are intended to include or otherwise cover all methods and apparatus for impeding, reducing, or avoiding this lateral movement.

In some embodiments, at least one of the pair of flanges of at least one of the body and door brackets is formed to define a bumper. In addition, a stopper can be provided to communicate with the bumper so as to reduce, impede, or prevent movement of the pin within the apertures. For example, the stopper can be elastic and disposed to maintain constant or substantially constant contact with the bumper, which is provided on at least one of the pair of flanges of at least one of the body and door brackets. The constant or substantially constant contact causes the pin to remain in contact with a surface or surfaces of the flanges defining the apertures, which impedes, reduces, or avoids lateral movement of the pin within the apertures of the flanges when the door is in the closed position.

Some embodiments are therefore directed to a hinge assembly for use with a vehicle door and a vehicle body member, the vehicle door being movable between open and closed positions. The hinge assembly can include a door bracket rigidly attached to the vehicle door, the door bracket including a flange that is configured to define a door bracket aperture. A body bracket can be rigidly attached to the vehicle body member, the body bracket including a flange that is configured to define a body bracket aperture. A pin can extend through the door bracket aperture and the body bracket aperture to thereby connect together the door and body brackets. A bumper can project from one of the door bracket and the body bracket. A stopper can be attached to the other of the door bracket and the body bracket, the stopper being configured to contact the bumper when the vehicle door is disposed in the closed position to thereby move the pin into contact with surfaces of the flanges of the door and body brackets that define the door bracket aperture and the body bracket aperture.

Some other embodiments are directed to a vehicle door assembly for use with a vehicle body member. The vehicle door assembly can include a vehicle door that is movable between open and closed positions, and a hinge assembly for connecting the vehicle door to the vehicle body member. The hinge assembly can include a door bracket rigidly attached to the vehicle door, the door bracket including a flange that is configured to define a door bracket aperture. A body bracket can be rigidly attached to the vehicle body member, the body bracket including a flange that is configured to define a body bracket aperture. A pin can extend through the door bracket aperture and the body bracket aperture to thereby connect together the door and body brackets. A bumper can project from one of the door bracket and the body bracket. A stopper can be attached to the other of the door bracket and the body bracket, the stopper being configured to contact the bumper when the vehicle door is disposed in the closed position to thereby move the pin into contact with surfaces of the flanges of the door and body brackets that define the door bracket aperture and the body bracket aperture.

Still other embodiments are directed to a method of manufacturing a hinge assembly for use with a vehicle door and a vehicle body member, the vehicle door being movable between open and closed positions. The method can include: rigidly attaching a door bracket to the vehicle door, the door bracket including a flange that is configured to define a door bracket aperture; rigidly attaching a body bracket to the vehicle body member, the body bracket including a flange that is configured to define a body bracket aperture; extending a pin through the door bracket aperture and the body bracket aperture to thereby connect together the door and body brackets; projecting a bumper from one of the door bracket and the body bracket; attaching a stopper to the other of the door bracket and the body bracket; and configuring the stopper to contact the bumper when the vehicle door is disposed in the closed position to thereby move the pin into contact with surfaces of the flanges of the door and body brackets that define the door bracket aperture and the body bracket aperture.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Various headings are provided below for convenience and clarity. However, these headings are not intended to limit the scope or content of the disclosure, and/or the scope of protection afforded the various inventive concepts disclosed herein.

I. Overall Vehicle

Figure 1:
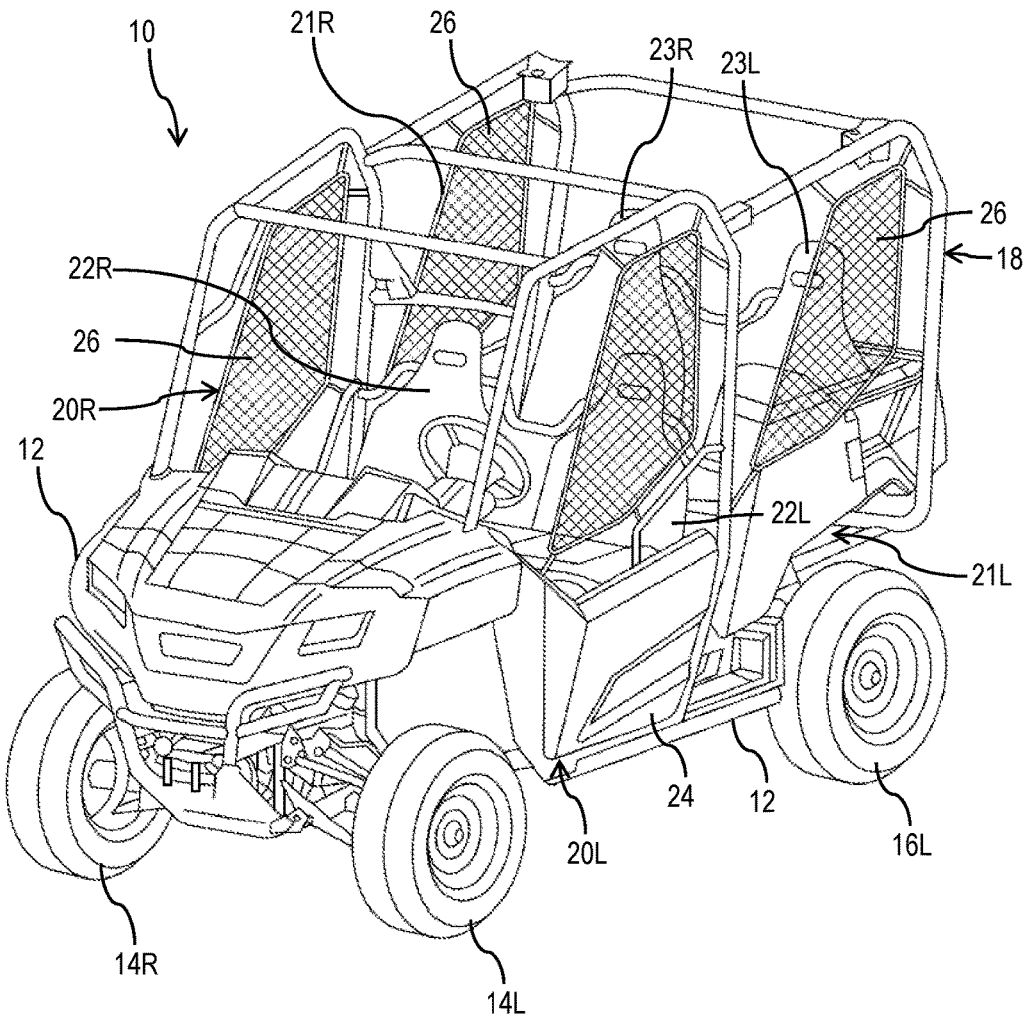
FIG. 1 is a perspective view of an exemplary vehicle including door assemblies in accordance with the disclosed subject matter.

FIG. 1 is a perspective view of an exemplary vehicle 10 including door assemblies in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed vehicle door hinge apparatus can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

The vehicle 10 can include a body 12, a pair of front wheels, 14L, 14R, a pair of rear wheels 16L, 16R (the right-side rear wheel 16R is obstructed from view), a frame assembly 18, a pair of front door assemblies 20L, 20R, a pair of rear door assemblies 21L, 21R, and a powertrain. Portions of the frame assembly 18 are hidden from view in FIG. 1 by the body 12, and the powertrain is omitted from FIG. 1 for simplicity and clarity of the drawing.

The vehicle 10 can include a pair of front seats 22L, 22R and a pair of rear seats 23L, 23R mounted in a passenger area of the vehicle 10. The frame assembly 18 can be configured to extend around and above the seats 22L, 22R, 23L, 23R and the passenger area. At least a portion of the frame assembly 18 can cooperate with the body 12 to define a pair of door openings through which a passenger may pass in order to enter or exit the passenger area.

The door assemblies 20L, 20R, 21L, 21R, which occupy the door openings, each can include a door 24 and window panel assembly 26, and can be configured to selectively open and close access through the door openings by moving between a closed position and an opened position. (The doors 24 of the right-side door assemblies 20R, 21R are obscured from view in FIG. 1). In the closed position, the door assemblies 20L, 20R, 21L, 21R can span the respective door openings to obstruct access to the passenger area via the door openings. The front portion of each door assembly 20L, 20R, 21L, 21R can also be latched to the frame assembly 18 in the closed position. The opened position can be any position where the door assemblies 20L, 20R, 21L, 21R are pivoted away from the respective door openings to provide access to the passenger area via the door openings. The door assemblies 20L, 20R, 21L, 21R can therefore be moved to a multitude of positions constituting the opened position, so long as some access to the passenger area is provided. FIG. 1 shows the door assemblies 20L, 20R, 21L, 21R in the closed position.

II. Door Assemblies

Figure 2:
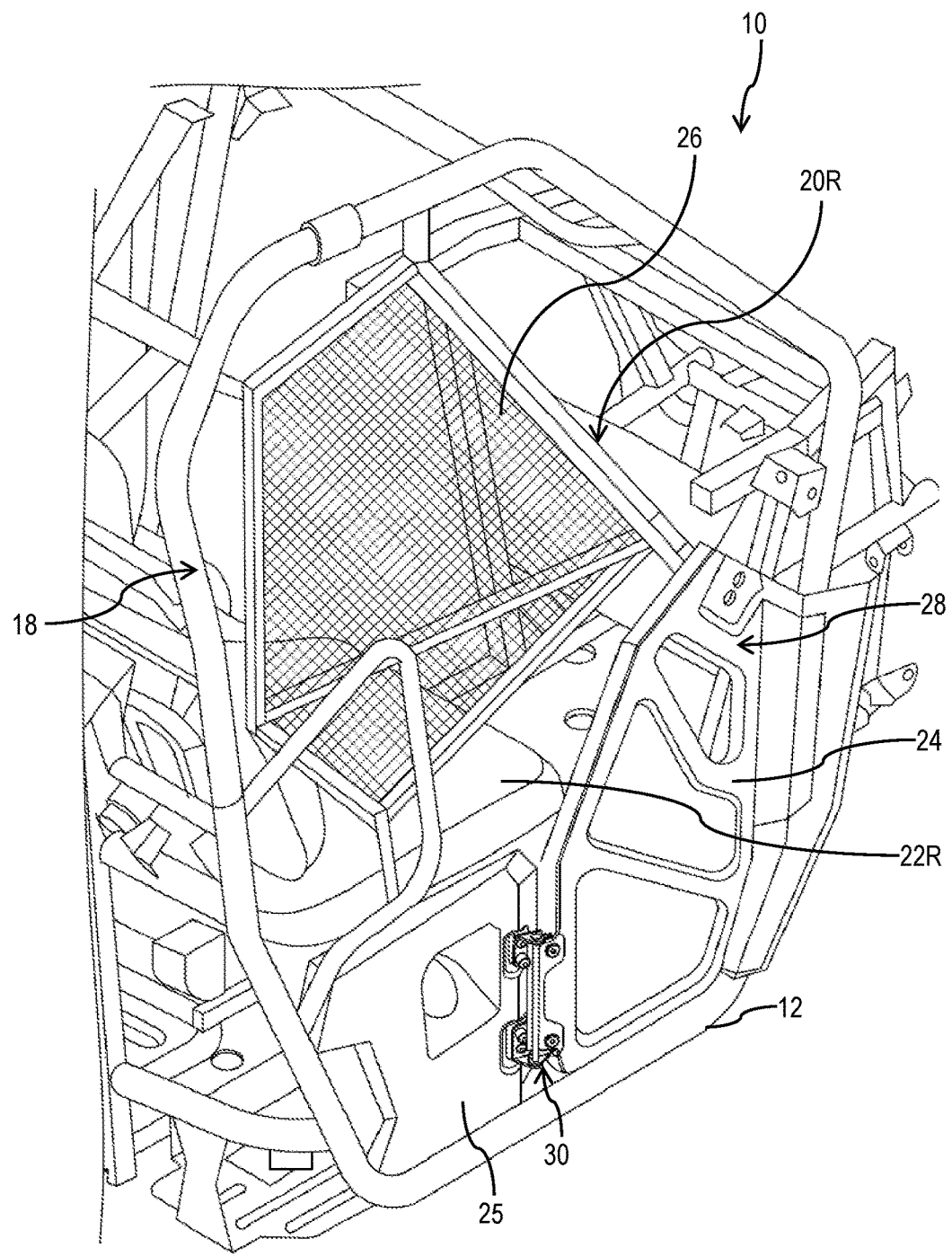
FIG. 2 is a partial perspective view of the door assembly of FIG. 1 including a hinge assembly.

FIG. 2 is a partial perspective view of the vehicle 10 including the vehicle door hinge of FIG. 1. (The left-side front door assembly 20L and the rear door assemblies 21L, 21R have been omitted for simplicity and clarity of the drawing.) The door assemblies 20L, 20R, 21L, 21R can each include a door 24 adjacent the window pane assembly 26, and a latch assembly (not shown) disposed within the door 24. The door assemblies 20L, 20R, 21L, 21R are each connected to respective portions of the body 12 of the vehicle 10 via a hinge assembly 30 so as to be configured to move between the closed position and the fully opened position. The hinge assembly 30 can specifically connect the respective door assemblies 20L, 20R, 21L, 21R to side panels 25 of the body 12. In the present embodiment, the latch assembly can be latched and unlatched at frontward portions of the door assemblies 20L, 20R, 21L, 21R such that the door assemblies 20L, 20R, 21L, 21R hinge rearwards to open. However, other embodiments may be configured to be latched and unlatched at rearward portions thereof such that the door assemblies 20L, 20R, 21L, 21R hinge forwards to open.

As will be discussed in greater detail below, the door assemblies 20L, 20R, 21L, 21R can be configured to rotate about the respective hinge assemblies 30 to permit ingress and egress of passengers.

III. Hinge Assemblies

Figure 3:
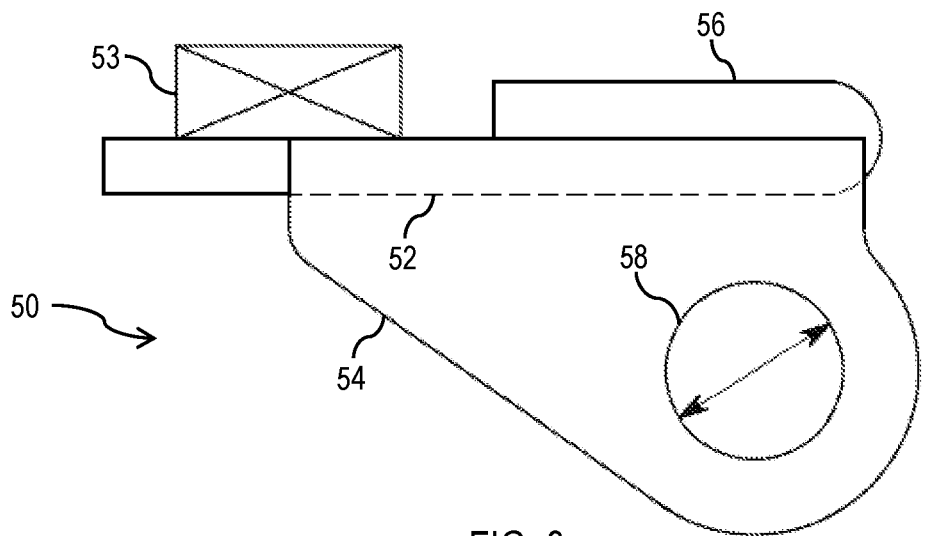
FIG. 3 is a plan view of a body bracket of the hinge assembly of FIG. 2.

FIG. 3 is a plan view of a door bracket 50 of the hinge assembly 30 of FIG. 2, in accordance with principles of the disclosed subject matter. The door bracket 50 can be configured to include a plate 52 joined to a knuckle 54. The plate 52 can be fastened to the respective door 24 of the vehicle 10 and the knuckle 54 can house a hinge pin 60 for linking the door bracket 50 to a body bracket 40. The knuckle 54 may be configured to include a rounded or knobbed portion through which the hinge pin 60 is inserted, as described below.

In the present embodiment, the plate 52 is approximately planar and may include a bumper 56 having a rounded surface configured to abut the stoppers 70 when the door assemblies 20L, 20R, 21L, 21R are each rotated to the closed position. Particularly, the bumper 56 may be disposed at an end of the plate 52 proximate the hinge pin 60. An aperture 58 may extend through the knuckle 54 along a longitudinal axis of the plate 52, the aperture 58 having a diameter larger than that of the hinge pin 60 such that the hinge pin 60 may be inserted therethrough.

As described below and shown in more detail in FIGS. 8 and 9, the door bracket 50 may include a pair of knuckles 54 disposed at upper and lower portions of the plate 52, the pair of knuckles 54 configured as relatively thin plates separated by a gap spanning approximately a length of the plate 52.

The door bracket 50 may also include a buffer 53 disposed on a surface of the plate 52 opposite the knuckle 54. The buffer 53 can be configured to abut a panel on the body 12 of the vehicle 10 when the door assemblies 20L, 20R, 21L, 21R are moved to the closed position, the buffer 53 separating the plate 52 from the panel on the body 12. In this way, the buffer 53 can prevent damage to either the body 12 or components of the door bracket 50 by softening closing impact on the body 12 and the door bracket 50. The buffer 53 may be rubber or any other material exhibiting impact absorbing effects.

Figure 4:
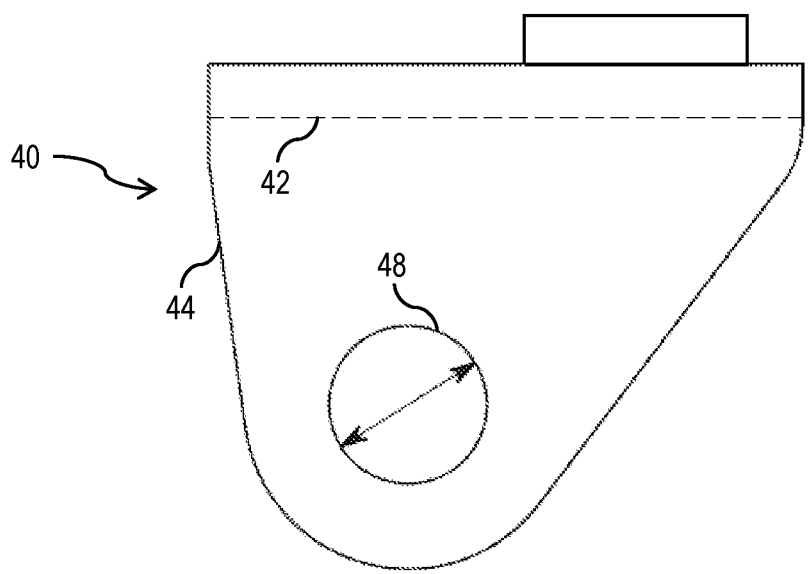
FIG. 4 is a plan view of a door bracket of the hinge assembly of FIG. 2.

FIG. 4 is a plan view of the body bracket 40 of the hinge assembly 30 of FIG. 2, in accordance with principles of the disclosed subject matter. The body bracket 40 can be configured to include a plate 42 joined to a knuckle 44. The plate 42 can be fastened to the body 12 of the vehicle 10 and the knuckle 44 can house the hinge pin 60 for linking the body bracket 40 to the door bracket 50. The knuckle 44 may be configured to include a rounded or knobbed portion through which the hinge pin 60 is inserted, as described below.

In the present embodiment, the plate 42 is approximately planar and may include a mount 46 for fastening the body bracket 40 to the side panel 25 of the body 12. Particularly, the mount 46 may be disposed at a distal end of the plate 42 from the hinge pin 60. An aperture 48 may extend through the knuckle 44 along a longitudinal axis of the plate 42, the aperture 48 having a diameter larger than that of the hinge pin 60 such that the hinge pin 60 may be inserted therethrough.

As described below and shown in more detail in FIGS. 8 and 9, the body bracket 40 may include a pair of knuckles 44 disposed at upper and lower portions of the plate 42, the pair of knuckles 44 configured as relatively thin plates separated by a gap spanning approximately a length of the plate 42.

Figure 5:
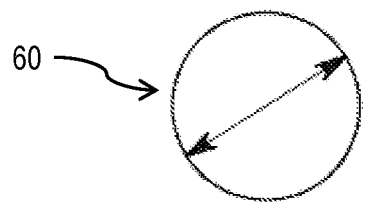
FIG. 5 is a plan view of a hinge pin of the hinge assembly of FIG. 2.

FIG. 5 is a plan view of the hinge pin 60 of the hinge assembly 30 of FIG. 2 in accordance with principles of the disclosed subject matter. The hinge pin 60 may be a cylindrical rod configured to be inserted through the apertures 48,58 in the respective knuckles 44,54 so as to connect the body bracket 40 to the door bracket 50. The diameter of the hinge pin 60 may be approximately less than the diameter of the apertures 48,58 so as to be readily insertable therethrough.

Figure 6:
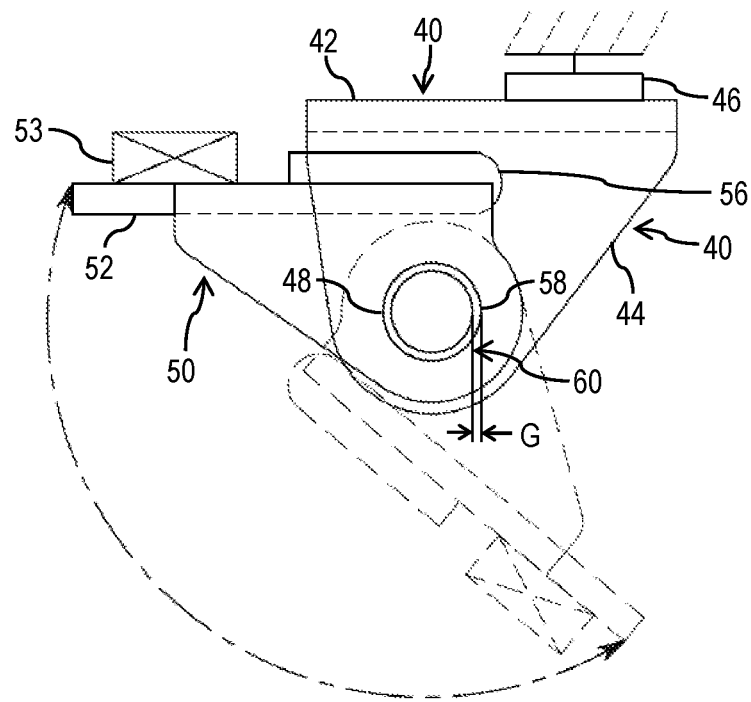
FIG. 6 is a plan view of the hinge assembly of FIG. 2 without a stopper.

FIG. 6 is a plan view of the hinge assembly 30 of FIG. 2 without the stopper 70. The hinge assembly 30 is shown without the stopper 70 in FIG. 6 to illustrate a gap G formed from dimensional differences between the hinge pin 60 and the apertures 48,58 in the body bracket 40 and the door bracket 50, respectively. The path of rotation between the opened and closed positions for the hinge assembly 30 is shown, with the door bracket 50 particularly shown in multiple positions corresponding to movement of the attached door assembly in relation to the body 12 of the vehicle 10.

The gap G between the hinge pin 60 and apertures 48,58 in FIG. 6 is maintained throughout opening and closing of the corresponding door assembly, and may therefore permit free play movement of the hinge pin 60 within the apertures 48,58. Furthermore, free play movement of the hinge pin 60 may result in free play movement of the door bracket 50 through which the hinge pin 60 is inserted, and the attached door assembly. The above described free play may result in rattling or vibrating of the aforementioned components of the vehicle 10, such as between the hinge pin 60, the door bracket 50, and the body bracket 40. Rattling or vibrating can lead to accelerated wear and breakage of components and/or undesirable noise.

Figure 7:
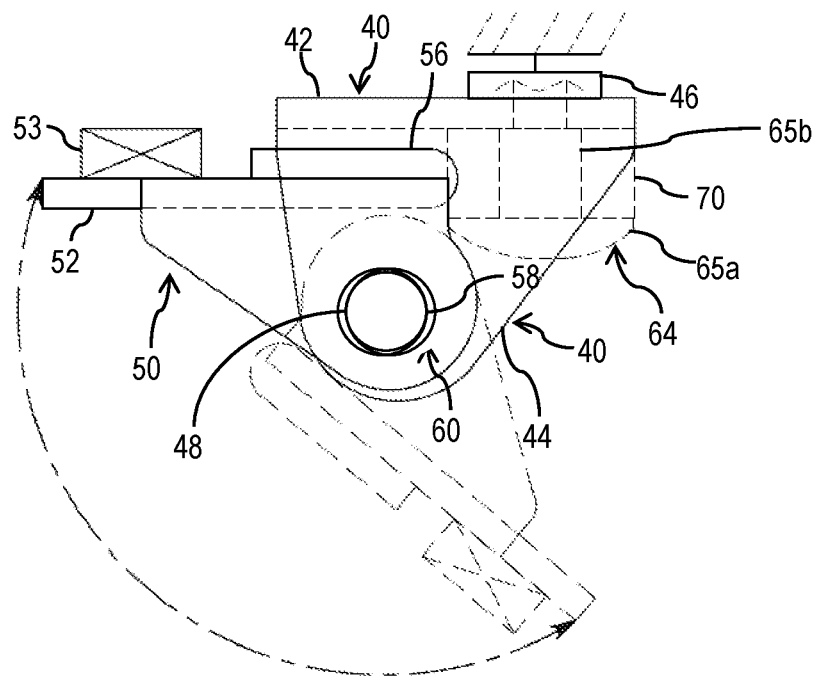
FIG. 7 is a plan view of the hinge assembly of FIG. 2 with the stopper.

FIG. 7 is a plan view of the hinge assembly 30 of FIG. 2 with the stopper 70. In the present embodiment, the stopper 70 can be disposed concentrically around a shaft 65b of a fastener 64 inserted through the plate 42 of the body bracket 40. The fastener 64 is inserted through the body bracket 40 to fasten the body bracket 40 to the body 12 of the vehicle 10, and particularly may fasten the plate 42 to the side panel 25. The fastener 64 can also be inserted or screwed through the mount 46 disposed on the opposing side of the plate 42 before entering the body 12. The fastener 64 includes a head 65a attached to the shaft 65b, the head 65a being configured to both facilitate fastening and maintain positioning of the stopper 70 around the shaft 65b. The head 65a may include complementary indentations shaped to cooperate with a fastening device such as a screwdriver or hex key, and the shaft 65b may be threaded or otherwise smooth. As shown in greater detail in FIGS. 8 and 9 and described below, the present embodiment may be configured with multiple fasteners 64 inserted through the body bracket 40 to secure the hinge assembly 30 to the body 12.

In the present embodiment, as the door bracket 50 is rotated between the opened and closed positions as shown, the door bracket 50 may displace the hinge pin 60 within the apertures 48,58, due to the gap G between the hinge pin 60 and the apertures 48,58, as described above. However, with the stopper 70 disposed proximate to the hinge pin 60, the stopper 70 is configured to abut the bumper 56 of the door bracket 50 upon rotating the door bracket 50 to the closed position. As the door bracket 50 is rotated to the closed position, the bumper 56 is rotated into contact with the stopper 70, the stopper 70 configured as a resilient member that elastically deforms to thereby bias the door bracket 50 away from the stopper 70. As the door bracket 50 is biased away from the stopper 70, the aperture 58 of the door bracket 50 is moved away from the stopper 70, which causes an interior surface of the aperture 58 to push against the hinge pin 60. With the aperture 58 of the door hinge 50 pushing against the hinge pin 60, the hinge pin 60 is displaced within the aperture 58 and pressed up against an interior of the aperture 48 of the body bracket 40. The hinge pin 60 is thereby held to be constrained by opposing interior surfaces of the apertures 48,58 as the stopper 70 resists deformation by the bumper 56, eliminating the above described gap G.

The door assemblies 20L, 20R, 21L, 21R of the present embodiment may be latched into the closed position to prevent further movement of the door assemblies 20L, 20R, 21L, 21R out of the closed position. When one of the door assemblies 20L, 20R, 21L, 21R is latched into the closed position, the bumper 56 of the door bracket 50 contacts and presses into the stopper 70, thereby biasing the door bracket 50 (via the bumper 56). However, with the respective door assemblies 20L, 20R, 21L, 21R latched into the closed position, the door bracket 50 is constrained and cannot freely rotate away from the stopper 70. Instead, the door bracket 50 and the attached door 24 are only capable of moving an amount corresponding to dimensions of the gap G present between the hinge pin 60 and the aperture 58 of the door bracket 50, as described above. In doing so, the stopper 70 biases the door bracket 50 to eliminate the gap G surrounding the hinge pin 60.

As a result of the door bracket 50 being biased to contact the hinge pin 60 and eliminate the gap G with the aperture 58, the door bracket 50 further moves the hinge pin 60 towards the interior surface of the aperture 48 of the body bracket 40. This movement further eliminates the gap G on the opposing side of the hinge pin 60 between the aperture 48 and the hinge pin 60, effectively wedging the hinge pin 60 between opposing interior surfaces of the apertures 48,58 of the door bracket 50 and the body bracket 40, respectively. The hinge pin 60 is thereby held in a relatively unmoving position while the door assemblies 20L, 20R, 21L, 21R are latched in the closed position, serving to prevent movement of the door bracket 50 (and the attached door 24) and the hinge pin 60. Therefore, the disposition of the door bracket 50 and the hinge pin 60 resulting from bias of the stopper 30 dampens vibration and reduces noise of the hinge assembly 30 during operation of the vehicle 10.

Figure 8:
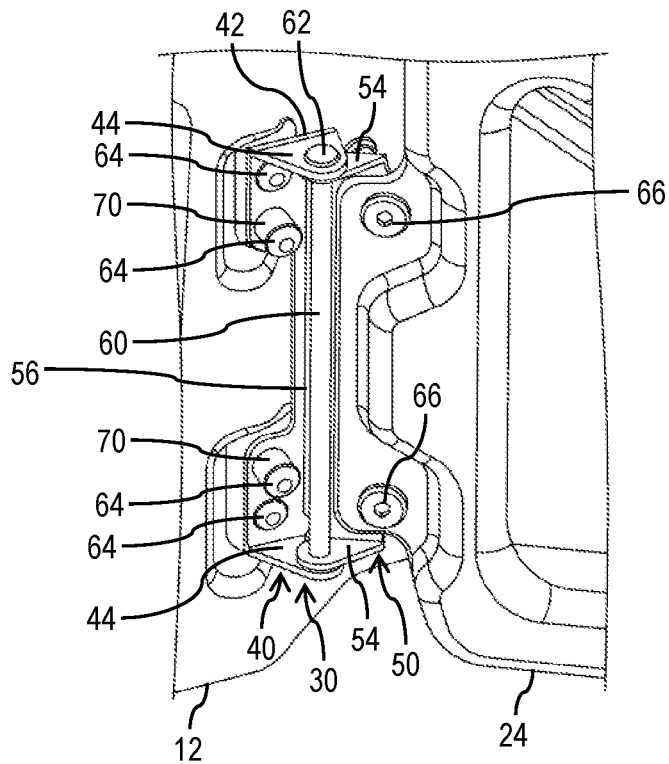
FIG. 8 is a perspective view of the hinge assembly of FIG. 2 in an opened position.

FIG. 8 is a perspective view of the hinge assembly 30 of FIG. 2 in the opened position. As described above, the hinge assembly 30 may include the body bracket 40 and the door bracket 50 connected via the hinge pin 60 extending through the respective apertures 48,58. In the present embodiment, the two knuckles 44 are disposed on opposing ends of the plate 42, the knuckles 44 extending parallel to one another and orthogonal to a direction that the plate 42 extends. The apertures 48 of the respective knuckles 44 overlap the apertures 58 of the knuckles 54 of the door bracket 50, which is similarly configured to include the two knuckles 54 extending from opposing ends of the plate 52. The hinge pin 60 thereby passes through the overlapped apertures 48,58 to hingedly connect the body bracket 40 and door bracket 50 together. The hinge pin 60 may be held in place by caps 62 disposed on both end faces, such that the hinge pin 60 is secured between the apertures 48,58 in the body bracket 40 and the door bracket 50.

The body bracket 40 of the present embodiment may be attached to the body 12 of the vehicle 10 by the fasteners 64 inserted therethrough, the fasteners 64 specifically being inserted through the plate 42 into the side panel 25 of the vehicle 10. The fasteners 64 may be configured as bolts, screws, or any other type of appropriate fastener to attach the body bracket 40 to the body 12, and other methods of attachment may be used altogether, such as adhesives. As shown in FIG. 8, a pair of the fasteners 64 may be inserted through both an upper portion of the plate 42, as well as a lower portion of the plate 42 to provide a total of four attachment points. However, other amounts and configurations of the fasteners 64 may be implemented to accomplish the above described attachment.

As described above, each stopper 70 may be configured to surround the shaft 65b of the respective fastener 64. In the present embodiment, two stoppers 70 may be included in the hinge assembly 30, with the stoppers 70 being disposed around the respective fasteners 64 at opposing sides of the body bracket 40. Additionally, the stoppers 70 may encircle the respective fasteners 64 nearer a central portion of the plate 42 of the body bracket 40, such that the fasteners 64 spaced farther from the central portion of the plate 42 are without stoppers. However, the stoppers 70 may be disposed around any appropriate fasteners 64 proximate the hinge pin 60 and rotating door bracket 50 such that the stoppers 70 are configured to contact the door bracket 50 upon closing the door 24. Furthermore, any number of stoppers 70 may be implemented in the hinge assembly 30, including one, two, three, four, five etc., with the number of stoppers 70 corresponding to the number of fasteners 64 around which the stoppers 70 are disposed. The stoppers 70 can also extend a height corresponding to a height of the shafts 65b of the fasteners 64, which may correspond to a distance from the plate 42 which the bumper 56 of the door bracket 50 is spaced when in the closed position, as described below.

As shown in FIG. 8, when the door bracket 50 of the hinge assembly 30 is in the opened position, the bumper 56 is not in contact with the stoppers 70 and is therefore not biased to constrain the hinge pin 70 between the door bracket 50 and the body bracket 40. However, as shown in FIG. 9 and described below, when the door bracket 50 is in the closed position, the hinge pin 70 and the door bracket 50 are biased by the stoppers 70 to prevent movement.

Figure 9:
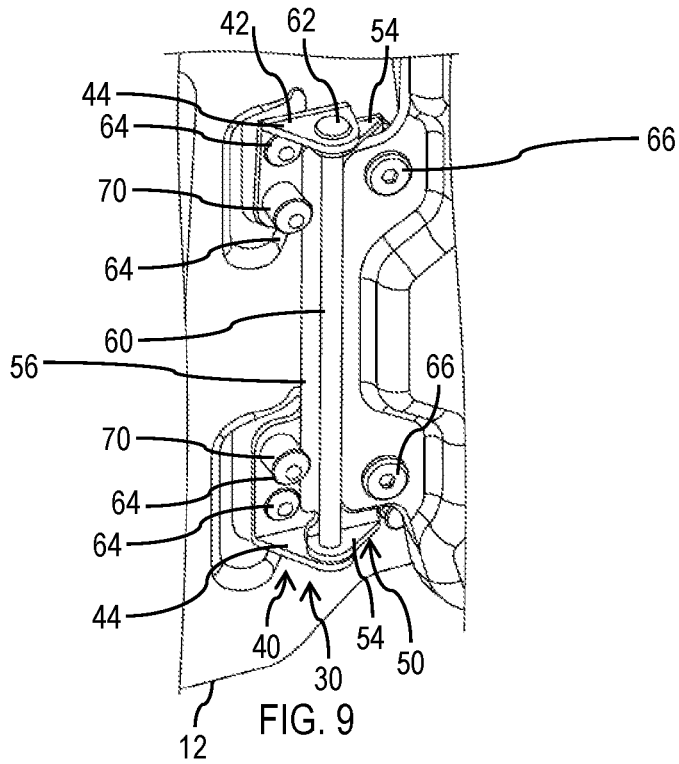
FIG. 9 is a perspective view of the hinge assembly of FIG. 2 in a closed position.

FIG. 9 is a perspective view of the hinge assembly 30 of FIG. 2 in the closed position. Shown in the closed position, the door bracket 50 in FIG. 9 is shown contacting the resilient stoppers 70, which bias the door bracket 50 to push the hinge pin 60 into a constrained position within the apertures 48,58. When the stoppers 70 bias the door bracket 50 and the hinge pin 60 to eliminate the gap G and prevent movement, the free play in the door bracket 50 and the hinge pin 60 is eliminated and vibration of those parts is dampened, as well as noise from vibration being reduced.

The door bracket 50 of the present embodiment is shown contacting sides of the stoppers 70 facing the hinge pin 60 when the bumper 56 of the door bracket 50 is rotated behind the hinge pin 60 to the closed position. In the closed position, with the door assemblies 20L, 20R, 21L, 21R and respective doors 24 latched in the closed positions, contact between the stoppers 70 and the door bracket 50 biases the door bracket 50 and consequently the hinge pin 60 into constrained positions, eliminating the gap G. Other embodiments may include elastic members configured to otherwise contact some portion of moving components of the hinge assembly 30 such as the door bracket 50, such that the components and/or the hinge pin 60 can be pressed into relatively static positions to resist movement and thereby reduce vibration and noise during operation of the vehicle 10.

IV. Alternate Embodiments

While certain embodiments of the invention are described above, and FIGS. 1-9 disclose the best mode for practicing the various inventive aspects, it should be understood that the invention can be embodied and configured in many different ways without departing from the spirit and scope of the invention.

For example, embodiments are disclosed above in the context of the stoppers 70 shown in FIGS. 2-9. However, embodiments are intended to include or otherwise cover any type of resilient member configured to contact a closure and thereby prevent movement disclosed above.

For example, exemplary embodiments are intended to include stoppers 70 that extend around shafts 65b of fasteners 64 inserted through the body bracket 40 for fastening to the vehicle 10. These stoppers 70 can completely surround the shafts 65b or partially surround the shafts 65b. In other words, a portion of the fasteners 64 proximate the hinging door bracket 50 may support a resilient member. In another alternate embodiment, stoppers 70 may extend around the fasteners 66 which are inserted through the door bracket 50 for fastening to the door 24. The stoppers 70 extending around the fasteners 66 of the door bracket 50 can be configured to contact the body bracket 40 in the closed position to bias the door bracket 50 and hinge pin 60 from movement, as similarly described above.

In fact, in some embodiments, the stoppers 70 do not extend around any fasteners. Instead, the stoppers 70 can be disposed along any portion of the hinge assembly 30 at which they may contact moving components to bias against movement when the door assemblies 20L, 20R, 21L, 21R are latched in the closed position.

All or some of the alternative structures disclosed above with regard to the stoppers 70 also apply to any additional or otherwise oriented resilient members configured to interact with the hinge assembly 30. The above alternative structures of the stoppers 70 are merely provided for exemplary purposes, and as indicated above, embodiments are intended to cover any type of generally resilient members proximate hinging structures of closure elements, such as a door, that operate or otherwise perform as disclosed above. Embodiments are also intended to include or otherwise cover any alternative or additional resilient members that are structured and disposed to perform as disclosed above with regard to the stoppers 70.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the adjustable arm rest mechanism disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A hinge assembly for use with a vehicle door and a vehicle body member, the vehicle door being movable between open and closed positions, the hinge assembly comprising:
  a door bracket rigidly attached to the vehicle door, the door bracket including a flange that is configured to define a door bracket aperture having a diameter;
  a body bracket rigidly attached to the vehicle body member, the body bracket including a flange that is configured to define a body bracket aperture having a diameter;
  a pin that extends through the door bracket aperture and the body bracket aperture to thereby connect together the door and body brackets, the pin having a diameter smaller than the diameter of the door bracket aperture and smaller than the diameter of the body bracket aperture such that gaps are formed between one side of the pin and the body bracket aperture and an opposing side of the pin and the door bracket aperture;
  a bumper that projects from the door bracket; and
  a stopper that is attached to the body bracket, the stopper being configured to contact the bumper and elastically deform when the vehicle door is disposed in the closed position to bias the door bracket away from the stopper and thereby displace the pin into contact with surfaces of the flanges of the door and body brackets that define the door bracket aperture and the body bracket aperture to thereby eliminate the gaps formed therebetween.

2. The hinge assembly according to claim 1, wherein the door bracket aperture and the body bracket aperture are each circular, and the pin defines a circular cross-section, a diameter of the cross-section of the pin being smaller than diameters of the door bracket aperture and the body bracket aperture.

3. The hinge assembly according to claim 1, wherein the door bracket includes upper and lower portions that are each attached to the vehicle door by separate door fasteners, and the body bracket includes upper and lower portions that are each attached to the vehicle body member by separate body fasteners.

4. The hinge assembly according to claim 3, wherein the flange of the door bracket is disposed at an upper end of the door bracket, the door bracket also including a lower flange at a lower end of the door bracket, the lower flange defining a lower door bracket aperture.

5. The hinge assembly according to claim 4, wherein the flange of the body bracket is disposed at an upper end of the body bracket, the body bracket also including a lower flange at a lower end of the body bracket, the lower flange defining a lower body bracket aperture.

6. The hinge assembly according to claim 5, wherein the pin is elongated and configured to extend through the door bracket aperture, the lower door bracket aperture, the body bracket aperture, and the lower body bracket aperture.

7. The hinge assembly according to claim 6, wherein each of the separate door fasteners and the separate body fasteners include a bolt.

8. The hinge assembly according to claim 7, wherein the stopper is disposed at the bolt that attaches the upper portion of the body bracket to the vehicle body member.

9. The hinge assembly according to claim 8, further including a lower stopper that is disposed at the bolt that attaches the lower portion of the body bracket to the vehicle body member, the stopper and the lower stopper being elastic.

10. The hinge assembly according to claim 9, wherein the bumper is elongated and extends along the door bracket.

11. A vehicle door assembly for use with a vehicle body member, the vehicle door assembly comprising:
a vehicle door that is movable between open and closed positions; and
a hinge assembly for connecting the vehicle door to the vehicle body member, the hinge assembly including:
a door bracket rigidly attached to the vehicle door, the door bracket including a flange that is configured to define a door bracket aperture having a diameter;
a body bracket rigidly attached to the vehicle body member, the body bracket including a flange that is configured to define a body bracket aperture having a diameter;
a pin that extends through the door bracket aperture and the body bracket aperture to thereby connect together the door and body brackets, the pin having a diameter smaller than the diameter of the door bracket aperture and smaller than the diameter of the body bracket aperture such that gaps are formed between one side of the pin and the body bracket aperture and an opposing side of the pin and the door bracket aperture;
a bumper that projects from the door bracket; and
a stopper that is attached to the body bracket, the stopper being configured to contact the bumper and elastically deform when the vehicle door is disposed in the closed position to bias the door bracket away from the stopper and thereby displace the pin into contact with surfaces of the flanges of the door and body brackets that define the door bracket aperture and the body bracket aperture to thereby eliminate the gaps formed therebetween.

12. The vehicle door assembly according to claim 11, wherein the door bracket aperture and the body bracket aperture are each circular, and the pin defines a circular cross-section, a diameter of the cross-section of the pin being smaller than diameters of the door bracket aperture and the body bracket aperture.

13. The vehicle door assembly according to claim 11, wherein the door bracket includes upper and lower portions that are each attached to the vehicle door by separate door fasteners, and the body bracket includes upper and lower portions that are each attached to the vehicle body member by separate body fasteners.

14. The vehicle door assembly according to claim 13, wherein the flange of the door bracket is disposed at an upper end of the door bracket, the door bracket also including a lower flange at a lower end of the door bracket, the lower flange defining a lower door bracket aperture.

15. The vehicle door assembly according to claim 14, wherein the flange of the body bracket is disposed at an upper end of the body bracket, the body bracket also including a lower flange at a lower end of the body bracket, the lower flange defining a lower body bracket aperture.

16. The vehicle door assembly according to claim 15, wherein the pin is elongated and configured to extend through the door bracket aperture, the lower door bracket aperture, the body bracket aperture, and the lower body bracket aperture.

17. The vehicle door assembly according to claim 16, wherein each of the separate door fasteners and the separate body fasteners include a bolt.

18. The vehicle door assembly according to claim 17, wherein the stopper is disposed at the bolt that attaches the upper portion of the body bracket to the vehicle body member.

19. The vehicle door assembly according to claim 18, further including a lower stopper that is disposed at the bolt that attaches the lower portion of the body bracket to the vehicle body member, the stopper and the lower stopper being elastic; and wherein the bumper is elongated and extends along the door bracket.

20. A method of manufacturing a hinge assembly for use with a vehicle door and a vehicle body member, the vehicle door being movable between open and closed positions, the method comprising:
rigidly attaching a door bracket to the vehicle door, the door bracket including a flange that is configured to define a door bracket aperture having a diameter;
rigidly attaching a body bracket to the vehicle body member, the body bracket including a flange that is configured to define a body bracket aperture having a diameter;
extending a pin through the door bracket aperture and the body bracket aperture to thereby connect together the door and body brackets, the pin having a diameter smaller than the diameter of the door bracket aperture and smaller than the diameter of the body bracket aperture such that gaps are formed between one side of the pin and the body bracket aperture and an opposing side of the pin and the door bracket aperture;
projecting a bumper from the door bracket;
attaching a stopper to the body bracket; and
configuring the stopper to contact the bumper and elastically deform when the vehicle door is disposed in the closed position to bias the door bracket away from the stopper and thereby displace the pin into contact with surfaces of the flanges of the door and body brackets that define the door bracket aperture to thereby eliminate the gaps formed therebetween.

21. The hinge assembly according to claim 1, wherein the stopper is configured to bias an upper portion of the door bracket away from the stopper.

* * * * *